United States Patent [19]
Hosoda et al.

[11] Patent Number: 5,754,508
[45] Date of Patent: May 19, 1998

[54] METHOD AND APPARATUS FOR SIMULTANEOUSLY RECORDING INFORMATION DATA ON TWO RECORDING SURFACES OF AN OPTICAL DISC AT EQUAL DATA STATES

[75] Inventors: Atsushi Hosoda; Hideharu Eguchi, both of Yokosuka, Japan

[73] Assignee: Victor Company of Japan, Ltd., Yokohama, Japan

[21] Appl. No.: 704,879

[22] Filed: Aug. 30, 1996

[30] Foreign Application Priority Data

Aug. 31, 1995 [JP] Japan .................. 7-248474

[51] Int. Cl.$^6$ .................. G11B 5/09; G11B 3/90
[52] U.S. Cl. .................. 369/49; 369/58
[58] Field of Search .................. 369/14, 32, 47, 369/48, 54, 58, 49, 44.37

[56] References Cited

U.S. PATENT DOCUMENTS

| | | | |
|---|---|---|---|
| 4,873,679 | 10/1989 | Murai et al. | 369/32 |
| 4,972,396 | 11/1990 | Rafner | 369/32 |
| 5,493,548 | 2/1996 | Kamioka | 369/48 |
| 5,506,825 | 4/1996 | Gushima et al. | 369/49 |
| 5,563,859 | 10/1996 | Masuda et al. | 369/47 |
| 5,568,467 | 10/1996 | Inagaki et al. | 369/275.3 |

FOREIGN PATENT DOCUMENTS

| | | |
|---|---|---|
| 0273384 | 7/1988 | European Pat. Off. . |
| 273384 | 7/1988 | European Pat. Off. . |
| 327033 | 8/1989 | European Pat. Off. . |
| 0487296 | 5/1992 | European Pat. Off. . |
| 0630006 | 12/1994 | European Pat. Off. . |
| 0643388 | 3/1995 | European Pat. Off. . |
| 52-16205 | 7/1977 | Japan . |
| 62-141601 | 6/1987 | Japan . |
| 4184782 | 7/1992 | Japan . |

*Primary Examiner*—Tan Dinh
*Attorney, Agent, or Firm*—Pollock, Vande Sande & Priddy

[57] ABSTRACT

First data is divided into second data and third data which are equal in data rate. The second data and the third data are fed to first and second recording heads respectively. The second data and the third data are simultaneously recorded on the first and second recording surfaces of the optical disc by the first and second recording heads respectively in a zoned constant linear velocity technique in which each of the first and second recording surfaces of the optical disc is divided into zones, and the zones of the first recording surface and the zones of the second recording surface are grouped into pairs each having a zone of the first recording surface and a zone of the second recording surface which are opposite to each other. In addition, the second data and the third data are simultaneously recorded on zones in a pair respectively while the first and second recording heads are moved in opposite directions respectively.

13 Claims, 8 Drawing Sheets

FIG. 8

| SECTOR / TRACK | 0 | 1 | 2 | -- | s-1 | s | s+1 | -- | 2z+18 |
|---|---|---|---|---|---|---|---|---|---|
| 3000(z-1) | → | | | | | | | | |
| 3000(z-1)+1 | | | | | | | | | |
| 3000(z-1)+2 | | | | | | | | | |
| ⋮ | | | | | | | | | |
| t-1 | | | | f-1 | | | f-1 | | |
| t | | | | | | f | | f | |
| t+1 | | | | | | | f+1 | | |
| ⋮ | | | | | | | | | |
| 3000z-3 | | | | | | | | | |
| 3000z-2 | | | | | | | | | |
| 3000z-1 | | | | | | | | | |

↓ INNER EDGE

OUTER EDGE

FIG. 9

| SECTOR / TRACK | 0 | 1 | 2 | -- | v-1 | v | v+1 | -- | 2z+18 |
|---|---|---|---|---|---|---|---|---|---|
| 3000(z-1) | | | | | | | | | |
| 3000(z-1)+1 | | | | | | | | | |
| 3000(z-1)+2 | | | | | | | | | |
| ⋮ | | | | | | | | | |
| u-1 | | | | f+1 | | | | | |
| u | | | | f | | f | | | |
| u+1 | | | | | f-1 | | f-1 | | |
| ⋮ | | | | | | | | | |
| 3000z-3 | | | | | | | | | |
| 3000z-2 | | | | | | | | | |
| 3000z-1 | | | | | | | | | ← |

INNER EDGE

OUTER EDGE ↑

FIG. 10

| ZONE | FRAME NUMBER | |
|---|---|---|
| | NTSC | PAL |
| 1 | 0~ 1968 | 0~ 1657 |
| 2 | 1969~ 4124 | 1658~ 3473 |
| 3 | 4125~ 6468 | 3474~ 5447 |
| 4 | 6469~ 8999 | 5448~ 7578 |
| 5 | 9000~11718 | 7579~ 9868 |
| 6 | 11719~14624 | 9869~12315 |
| 7 | 14625~17718 | 12316~14921 |
| 8 | 17719~20999 | 14922~17684 |
| 9 | 21000~24468 | 17685~20605 |
| 10 | 24469~28124 | 20606~23684 |
| 11 | 28125~31968 | 23685~26921 |
| 12 | 31969~35999 | 26922~30315 |
| 13 | 36000~40218 | 30316~33868 |
| 14 | 40219~44624 | 33869~37578 |
| 15 | 44625~49218 | 37579~41447 |

METHOD AND APPARATUS FOR SIMULTANEOUSLY RECORDING INFORMATION DATA ON TWO RECORDING SURFACES OF AN OPTICAL DISC AT EQUAL DATA STATES

BACKGROUND OF THE INVENTION

1. Field of the Invention

This invention relates to a method of recording information on an erasable-type optical disc or a rewritable-type optical disc having two recording surfaces. This invention also relates to an apparatus for recording information on an erasable-type optical disc or a rewritable-type optical disc having two recording surfaces.

2. Description of the Prior Art

Japanese published unexamined patent application 4-184782 discloses an apparatus which records and reproduces information on and from an optical disc having two recording surfaces. During the recording and reproduction of the information on and from the optical disc, the optical disc is driven at a constant rotational speed. Each of the recording surfaces of the optical disc is divided into a plurality of zones having equal dimensions along a radial direction.

In the apparatus of Japanese application 4-184782, first optical heads are assigned to the zones of the first recording surface respectively, and second optical heads are assigned to the zones of the second recording surface respectively. During the recording and reproduction of the information on and from the optical disc, the first optical heads move from outer edges toward inner edges of the respective zones of the first recording surface while the second optical heads move from inner edges toward outer edges of the respective zones of the second recording surface. Accordingly, the sum of the linear velocities of the first optical heads and the second optical heads relative to the optical disc remains approximately constant.

The information recording and reproduction implemented by the apparatus of Japanese application 4-184782 use a ZCAV (zoned constant angular velocity) technique.

In a typical ZCAV-based way of recording data on an erasable-type optical disc having two recording surfaces, a data transmission rate is changed from zone to zone to equalize recording densities of zones. Generally, a complicated process is necessary to implement the change of the data transmission rate from zone to zone. The data transmission rate related to an outermost part of the disc is considerably different from that related to an innermost part thereof. Accordingly, it is necessary to correct or vary a recording factor such as a recording pulse width or a recording laser power in accordance with a radial position of an accessed part of the disc.

A phase-change-type optical disc belongs to the erasable-type optical disc family (the rewritable-type optical disc family). In the phase-change-type optical disc, recording conditions sensitively depend on the linear velocity of an optical head relative to the disc. When recording conditions move out of a suitable range, information can not be correctly overwritten on an optical disc. In the case where information is recorded on a phase-change-type optical disc by a ZCAV technique, the linear velocity of an optical head relative to the disc at an outermost part thereof is considerably higher than that at an innermost part thereof. Accordingly, in this case, recording conditions related to the outermost part of the disc are greatly different from those related to the innermost part thereof.

Thus, it tends to be difficult to maintain recording conditions within a suitable range over the entire area of the disc.

SUMMARY OF THE INVENTION

It is an object of this invention to provide an improved method of recording information on an erasable-type optical disc (a rewritable-type optical disc) having two recording surfaces.

It is another object of this invention to provide an improved apparatus for recording information on an erasable-type optical disc (a rewritable-type optical disc) having two recording surfaces.

A first aspect of this invention provides a method of recording information on an erasable-type optical disc having first and second recording surfaces, the method comprising the steps of dividing first data into second data and third data which are equal in data rate; feeding the second data and the third data to first and second recording heads respectively; and simultaneously recording the second data and the third data on the first and second recording surfaces of the optical disc by the first and second recording heads respectively in a zoned constant linear velocity technique in which each of the first and second recording surfaces of the optical disc is divided into zones, and the zones of the first recording surface and the zones of the second recording surface are grouped into pairs each having a zone of the first recording surface and a zone of the second recording surface which are opposite to each other, and in which the second data and the third data are simultaneously recorded on zones in a pair respectively while the first and second recording heads are moved in opposite directions respectively.

A second aspect of this invention is based on the first aspect thereof, and provides a method wherein the second data corresponds to odd fields, and the third data corresponds to even fields.

A third aspect of this invention is based on the first aspect thereof, and provides a method further comprising the step of adding one out of information of absolute time and information of a frame order number to the second data and the third data before the second data and the third data are recorded on the optical disc.

A fourth aspect of this invention provides an apparatus for recording information on an erasable-type optical disc having first and second recording surfaces, the apparatus comprising first means for dividing first data into second data and third data which are equal in data rate; first and second recording heads; second means for feeding the second data and the third data to the first and second recording heads respectively; and third means for simultaneously recording the second data and the third data on the first and second recording surfaces of the optical disc by the first and second recording heads respectively in a zoned constant linear velocity technique in which each of the first and second recording surfaces of the optical disc is divided into zones, and the zones of the first recording surface and the zones of the second recording surface are grouped into pairs each having a zone of the first recording surface and a zone of the second recording surface which are opposite to each other, and in which the second data and the third data are simultaneously recorded on zones in a pair respectively while the first and second recording heads are moved in opposite directions respectively.

A fifth aspect of this invention is based on the fourth aspect thereof, and provides an apparatus wherein the second data corresponds to odd fields, and the third data corresponds to even fields.

A sixth aspect of this invention is based on the fourth aspect thereof, and provides an apparatus further comprising fourth means for adding one out of information of absolute time and information of a frame order number to the second data and the third data before the second data and the third data are recorded on the optical disc.

BRIEF DESCRIPTION OF THE DRAWINGS

FIG. 8 is a diagram of an example of recording conditions of each zone on the A surface of an erasable-type optical disc in the embodiment of this invention.

FIG. 9 is a diagram of an example of recording conditions of each zone on the B surface of the optical disc in the embodiment of this invention.

FIG. 10 is a diagram of the relation between a frame order number "f" and a zone order number "z" in the embodiment of this invention.

DESCRIPTION OF THE PREFERRED EMBODIMENT

Figure 1:
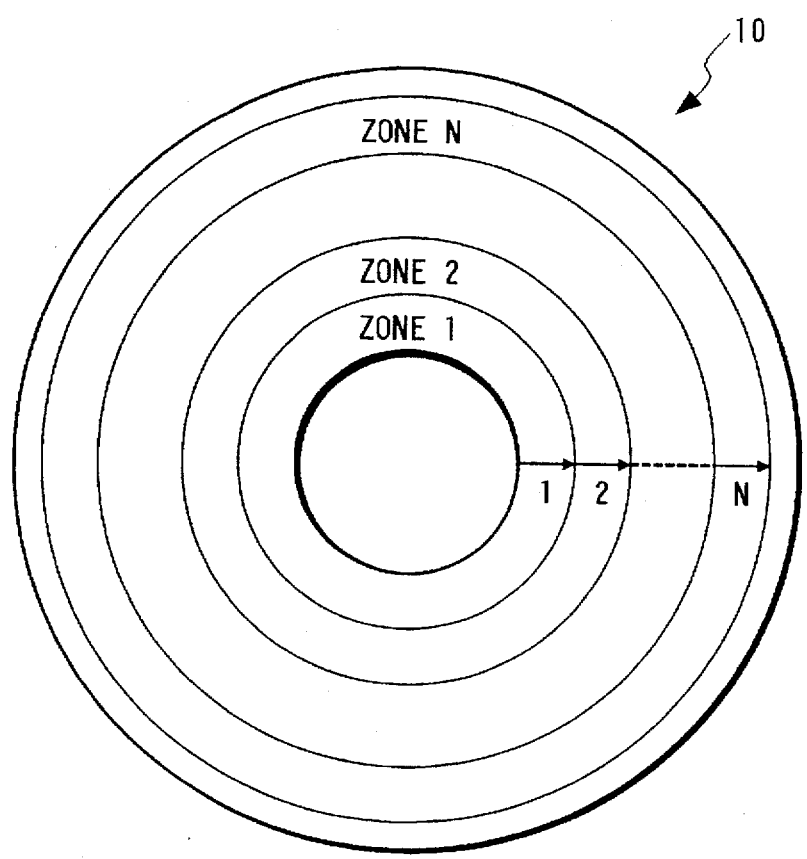
FIG. 1 is a diagram of an A surface of an erasable-type optical disc according to an embodiment of this invention.
Figure 2:
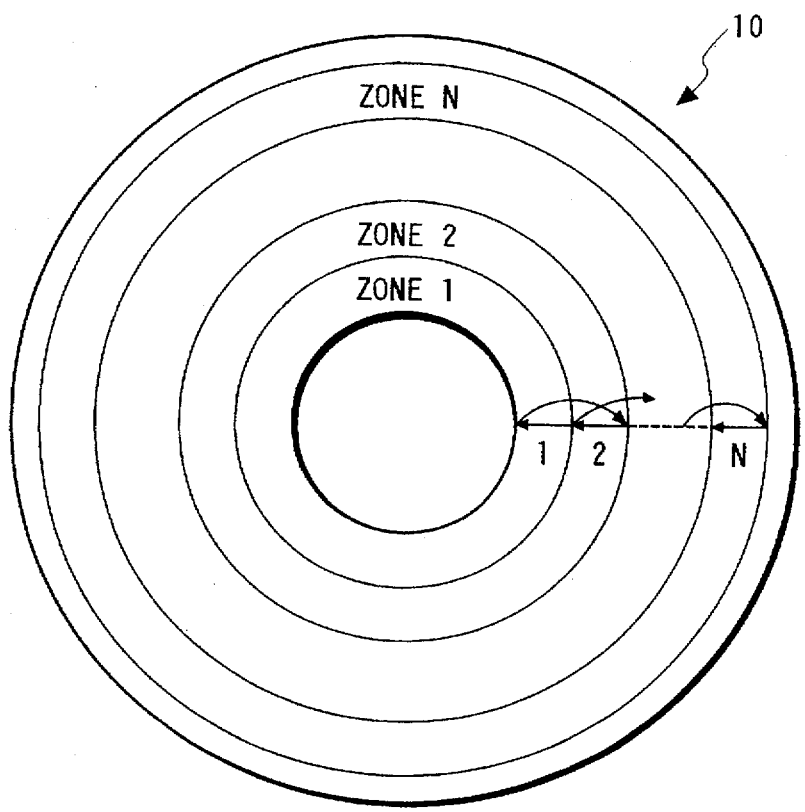
FIG. 2 is a diagram of a B surface of the erasable-type optical disc in the embodiment of this invention.

With reference to FIGS. 1 and 2, an erasable-type optical disc (a rewritable-type optical disc) 10 has two recording surfaces, that is, an A surface and a B surface. Each of the A surface and the B surface has a spiral information track. Each of the A surface and the B surface is divided into N concentric annular zones, where N denotes a given natural number equal to 2 or more. The A surface and the B surface are similar to each other in the designing of zones, a track, and sectors.

For example, the erasable-type optical disc 10 is formed by bonding two sub optical discs together. In this case, the sub optical discs are of a same format, and each of the sub optical discs has a single recording surface.

Figure 3:
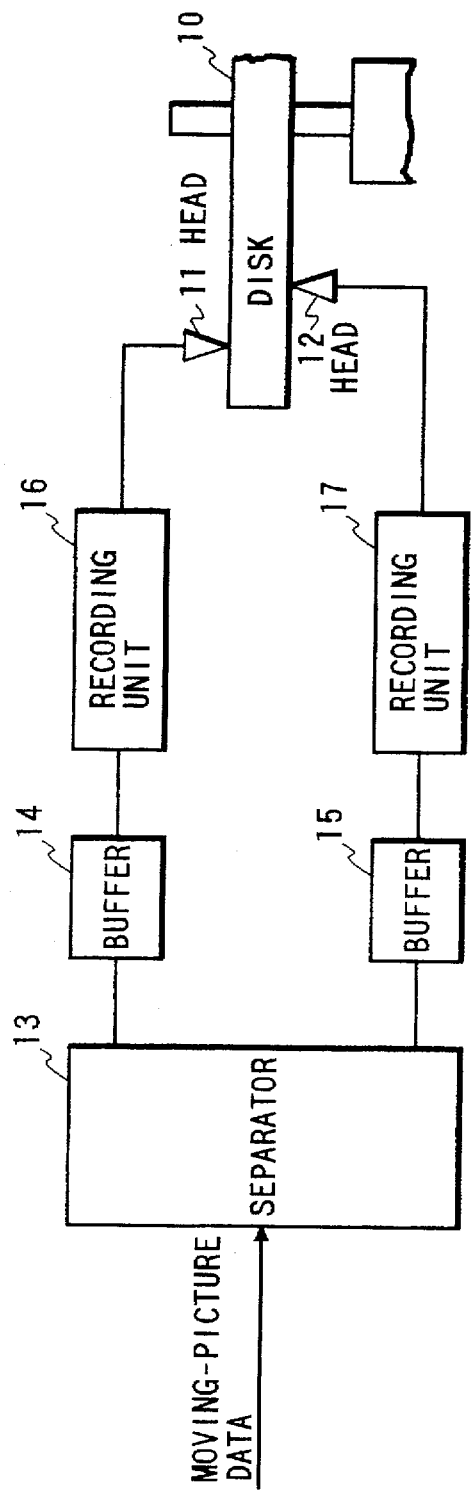
FIG. 3 is a block diagram of a recording apparatus according to the embodiment of this invention.

With reference to FIG. 3, a recording apparatus includes optical heads 11 and 12, a separator 13, buffer memories 14 and 15, and recording units 16 and 17. An input side of the separator 13 is subjected to moving-picture data to be recorded. The separator 13 has two output sides followed by the buffer memories 14 and 15 respectively. The buffer memory 14 is successively followed by the recording unit 16 and the optical head 11. The buffer memory 15 is successively followed by the recording unit 17 and the optical head 12.

The moving-picture data is divided by the separator 13 into first data to be recorded on the A surface of the optical disc 10 and second data to be recorded on the B surface of the optical disc 10.

The first data and the second data are equal in data rate. Specifically, the moving-picture data is divided into data related to odd fields and data related to even fields. The odd-field data is stored into the buffer memory 14 from the separator 13. The even-field data is stored into the buffer memory 15 from the separator 13.

The recording unit 16 reads out the odd-field data from the buffer memory 14, and converts the readout odd-field data into a form suited for the record on the optical disc 10. The recording unit 16 outputs the resultant odd-field data to the optical head 11. The optical head 11 records the odd-field data on the A surface of the optical disc 10.

The recording unit 17 reads out the even-field data from the buffer memory 15, and converts the readout even-field data into a form suited for the record on the optical disc 10. The recording unit 17 outputs the resultant even-field data to the optical head 12. The optical head 12 records the even-field data on the B surface of the optical disc 10.

The zones on the A surface and the zones on the B surface of the optical disc 10 are grouped into pairs each having an A-surface zone and a B-surface zone opposite to each other. An A-surface zone and a B-surface zone in each pair are simultaneously subjected to recording processes. The A-surface zone is scanned from an inner edge toward an outer edge thereof while the B-surface zone is scanned from an outer edge toward an inner edge thereof. Accordingly, the direction of radial movement of the optical head 11 is opposite to the direction of radial movement of the optical head 12.

After the scanning of a B-surface zone is completed, the optical head 12 jumps from the inner edge of the B-surface zone to an outer edge of a next B-surface zone. On the other hand, the optical head 11 does not jump. The buffer memories 14 and 15 are used to compensate for a difference in timing between odd-field data and even-field data which would be caused by a jump of the optical head 12.

Figure 4:
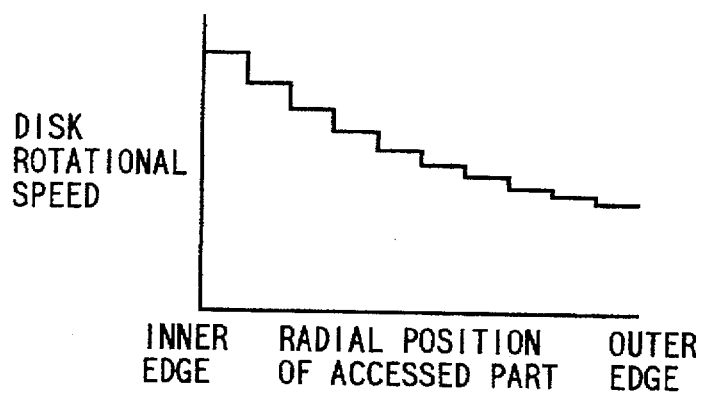
FIG. 4 is a diagram of the relation between the rotational speed of an erasable-type optical disc and the radial position of a currently-accessed part of the optical disc in the embodiment of this invention.
Figure 5:
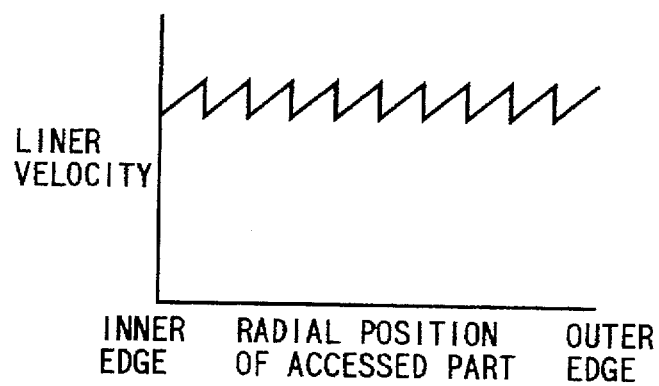
FIG. 5 is a diagram of the relation between the linear velocity of an optical head relative to an erasable-type optical disc and the radial position of a currently-accessed part of the optical disc in the embodiment of this invention.
Figure 6:
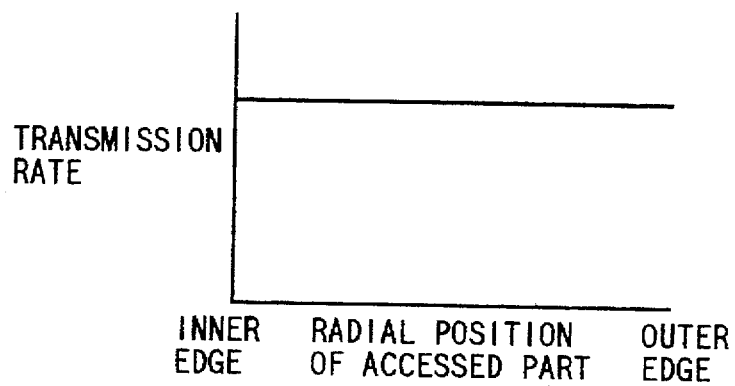
FIG. 6 is a diagram of the relation between the transmission rate of data recorded on the A surface of an erasable-type optical disc and the radial position of a currently-accessed part of the optical disc in the embodiment of this invention.
Figure 7:
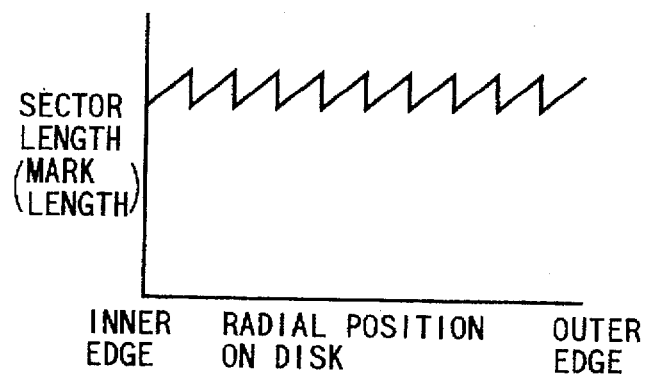
FIG. 7 is a diagram of the relation between the sector length (the mark length) in an erasable-type optical disc and a radial position on the optical disc in the embodiment of this invention.

The recording of the odd-field data on the A surface of the optical disc 10 by the optical head 11 uses a ZCLV (zoned constant linear velocity) technique. During the ZCLV-based data recording, as shown in FIG. 4, the rotational speed of the optical disc 10 depends on the radial position of a currently-accessed part of the optical disc 10. In addition, as shown in FIG. 5, the linear velocity of the optical head 11 relative to the optical disc 10 remains approximately constant independent of the radial position of a currently-accessed part of the optical disc 10. Further, as shown in FIG. 6, the transmission rate of the odd-field data recorded on the A surface of the optical disc 10 remains constant independent of the radial position of a currently-accessed part of the optical disc 10. In addition, as shown in FIG. 7, the sector length (the mark length) remains approximately constant independent of the radial position on the optical disc 10.

According to the ZCLV-based data recording, while a currently-accessed part remains in each of the zones on the A surface of the optical disc 10, the odd-field data is recorded on the zone by a CAV (constant angular velocity) technique. Thus, as shown in FIG. 4, the rotational speed of the optical disc 10 remains constant while a currently-accessed part of the optical disc 10 continues to be in a same zone. In addition, as shown in FIG. 5, the linear velocity of the optical head 11 relative to the optical disc 10 increases in accordance with movement of a currently-accessed part of the optical disc 10 from an inner edge to an outer edge of a same zone. Also, as shown in FIG. 7, the sector length (the mark length) increases in accordance with movement of a currently-accessed part of the optical disc 10 from an inner edge to an outer edge of a same zone.

Conditions of the scanning of each zone on the B surface of the optical disc 10 by the optical head 12 are determined by the above-indicated conditions of the scanning of each zone on the A surface of the optical disc 10 by the optical head 11.

FIG. 8 shows an example of recording conditions of each zone on the A surface of the optical disc 10. FIG. 9 shows an example of recording conditions of each zone on the B surface of the optical disc 10. The zones on each of the A surface and the B surface of the optical disc 10 are given serial identification numbers (serial order numbers) of 1, 2, ..., N respectively. Accordingly, there is a sequence of a zone "1", a zone "2", ..., and a zone "N" on each of the A surface and the B surface of the optical disc 10. The innermost zone has an identification number "1" while the outermost zone has an identification number "N" (see FIGS. 1 and 2).

In FIGS. 8 and 9, "z" denotes such a zone identification number (a zone order number). Circle-corresponding portions of the track on each of the A surface and the B surface of the optical disc 10 are given serial identification numbers (serial order numbers) of 0, 1, 2, 3, . . . respectively. Accordingly, there is a sequence of a circle-corresponding track portion "0", a circle-corresponding track portion "1", a circle-corresponding track portion "2", ... on each of the A surface and the B surface of the optical disc 10. The innermost circle-corresponding portion of the track in the zone "1" has an identification number "0".

As shown in FIG. 4, according to the ZCLV-based data recording, while a currently-accessed part remains in one zone, the data is recorded on the zone by a CAV (constant angular velocity) technique. As shown in FIGS. 8 and 9, according to the ZCLV-based data recording, the amount (the number of bits) of recorded data per circle-corresponding portion of the track remains constant in one zone. In an inter-zone view, the linear velocity of the optical head 11 or 12 relative to the optical disc 10 remains approximately constant independent of the radial position of a currently-accessed part of the optical disc 10. Accordingly, data recording and reproduction at a high constant transmission rate can be implemented over the entire area of the optical disc 10. Furthermore, even in the case where the erasable-type optical disc 10 is a phase-change-type optical disc, recording conditions can be surely maintained within a suitable range over the entire area of the optical disc 10.

An A-surface zone and a B-surface zone in each pair are equal in recording capacity. This enables simplification of the data dividing process executed by the separator 13. As previously described, the moving-picture data is divided by the separator 13 into the odd-field data and the even-field data. The odd-field data and the even-field data are simultaneously recorded by the optical heads 11 and 12 on an A-surface zone and a B-surface zone in a pair respectively.

During playback, the odd-field data and the even-field data are simultaneously read out from an A-surface zone and a B-surface zone in a pair respectively, and the readout odd-field data and the readout even-field data are combined into the original moving-picture data. During playback, only one of the odd-field data and the even-field data may be read out from the optical disc 10. In this case, pictures corresponding to odd fields or even fields are reproduced.

Each of the recording units 16 and 17 includes a microcomputer or a similar device which is programmed to superimpose at least one of absolute time information of every frame and information of a frame order number on the recorded moving-picture data. According to the ZCLV-based data recording, the recording capacity per circle-corresponding portion of the track varies from zone to zone. Thus, in some cases, recorded data corresponding to one frame overflows from one circle-corresponding portion of the track. A search for a head of a recorded program is implemented by a reproducing apparatus as follows. When a user designates a recorded program, a CPU in the reproducing apparatus decides a frame order number or absolute time which corresponds to the head of the designated program. For example, the reproducing apparatus includes a memory storing information of the relation between a frame order number (or absolute time) and a head of each recorded program. The CPU accesses this memory and refers to the information of the relation in deciding the frame order number or the absolute time corresponding to the head of the designated program. Then, the CPU calculates a zone order number (a zone identification number), a track order number (a track identification number), and a sector order number (a sector identification number), which correspond to the head of the designated program, from the decided frame order number or the decided absolute time. Subsequently, the CPU moves optical heads to positions corresponding to the calculated zone order number, the calculated track order number, and the calculated sector order number. In this way, the optical heads of the reproducing apparatus are moved to positions corresponding to the head of the designated program.

An example of the erasable-type optical disc 10 has a diameter of about 120 mm and a recording area extending between a radius of 24.5 mm and a radius of 58 mm. In addition, the example of the erasable-type optical disc 10 has a track pitch Tp of 0.75 μm. In the example of the erasable-type optical disc 10, the total number of circle-corresponding portions of the track on the A surface or the B surface is equal to 45,000. The each of the A surface and the B surface of the example of the erasable-type optical disc 10 is divided into 15 zones each having 3,000 circle-corresponding portions of the track (see FIGS. 8 and 9). Thus, the zone order number (the zone identification number) "z" is variable as $1 \leq z \leq 15$. Accordingly, there is a sequence of a zone "1", a zone "2", ..., and a zone "15". The total number of sectors per circle-corresponding portion of the track is set as "2z+19". Accordingly, the total number of sectors per circle-corresponding portion of the track varies from zone to zone. Sectors in every circle-corresponding portion of the track are given serial identification numbers (serial order numbers) of 0, 1, 2, ..., 2z+18 (see FIGS. 8 and 9). Thus, there is a sequence of a sector "0", a sector "1", a sector "2", ..., and a sector "2z+18".

When an NTSC television signal is digitized, digital data occurs at a rate of about 115 Mbps. In the case where the digital data is then compressed to about one fifth of the original data rate and error correction data is added to the compression-resultant data, the finally available digital signal has a data rate of about 31 Mbps. In addition, every frame represented by the finally available digital signal corresponds to about 128 kilobytes (kB). The finally available digital data is recorded on the erasable-type optical disc 10 at a rate of about 64 kB per frame in connection with each of the A surface and the B surface of the optical disc 10. When the recording capacity per sector is set to 2 kB, the total number of sectors per frame is equal to 32.

As shown in FIG. 8, odd-field data segments are recorded on each zone of the A surface of the erasable-type optical disc 10 in a given sequence from an inner part toward an outer part of the optical disc 10 according to frame order numbers ( . . . f–1, f, f+1, . . . ). As shown in FIG. 9, even-field data segments are recorded on each zone of the B surface of the erasable-type optical disc 10 in a given sequence from an outer part toward an inner part of the optical disc 10 according to frame order numbers (f–1, f, f+1, . . . ).

Now, the letter "z", the letter "s", and the letter "t" are used as indications of a zone order number, a sector order number, and a track order number which correspond to an A-surface position of a head of a recorded data segment related to a frame order number "f". The zone order number "z" is variable as z=1, 2, . . . , N. The sector order number "s" is variable as $0 \leq s \leq 2z+19$. The track order number "t" is variable as $0 \leq t$.

The A surface and the B surface of the erasable-type optical disc 10 are similar in formats of the sector order number and the track order number. The frame order number "f" is variable as $0 \leq f$. As shown in FIGS. 8 and 9, odd-field data segments and even-field data segments related to same frames are sequentially recorded on a pair of an A-surface zone and a B-surface zone on the erasable-type optical disc 10.

A description will now be given of calculation of the zone order number "z", the sector order number "s", and the track order number "t" which correspond to the A-surface position of the head of the recorded data segment related to the frame order number "f".

The sum s1 of the sectors in the zone "1" to the zone "z–1" is given as follows.

$$s1 = \sum_{k=1}^{z-1} 3000(2k+19) \quad (1)$$
$$= 3000(z-1)(z+19)$$

In the case where the data segment recorded on the sector "0" in the A-surface zone "1" relates to a frame order number "a", the zone order number "z" corresponding to the A-surface position of the head of the recorded data segment related to the frame order number "f" is given by the integer part "int(w)" of the value "w" expressed in the following equation.

$$3000(w-1)(w+19)=32(f-a)+1 \quad (2)$$
$$z=\text{int}(w) \quad (3)$$

When a=0, that is, when the data segment recorded on the sector "0" in the A-surface zone "1" relates to a frame order number "0", the equations (2) and (3) provide the relation between the frame order number "f" and the zone order number "z" corresponding to the A-surface position of the head of the recorded data segment related to the frame order number "f". The relation between the frame order number "f" and the zone order number "z" is shown in FIG. 10. The relation between the frame order number "f" and the zone order number "z" depends on whether the recorded data conforms to the NTSC system or the PAL system.

In the case where the relation between the frame order number "f" and the zone order number "z" is fixed as shown in FIG. 10, information representing this relation may be stored in a ROM within the recording apparatus or the reproducing apparatus.

The number s2 of the sectors in the zone "z" which store data segments up to the end data segment related to the frame order number "f–1" is given as follows.

$$s2=\{f-3000(z-1)\}(2z+19)+s \quad (4)$$

The number s3 of the sectors storing the data segments related to the frame order number "0" to the frame order number "f–1" is equal to the sum of the numbers s1 and s2. Therefore, in the case where the recorded data conforms to the NTSC system, the number s3 is given as follows.

$$\begin{aligned} s3 &= (2z+19)f+s-3000z(z-1) \quad (5) \\ &= 32f \end{aligned}$$

where $0 \leq s \leq 2z+19$. According to the equation (5), the sector order number "s" corresponding to the A-surface position of the head of the recorded data segment related to the frame order number "f" is given as follows.

$$s=\{32f+3000z(z-1)\} \% (2z+19) \quad (6)$$

where " . . . % . . . " denotes the remainder in the division of the term preceding "%" by the term following "%". According to the equation (5), the track order number "t" corresponding to the A-surface position of the head of the recorded data segment related to the frame order number "f" is given as follows.

$$t=\{32f+3000z(z-1)-s\}/(2z+19) \quad (7)$$

The equations (6) and (7) are good in the case where the recorded data conforms to the NTSC system.

A description will now be given of calculation of the zone order number "z", the sector order number "v", and the track order number "u" which correspond to the B-surface position of the head of the recorded data segment related to the frame order number "f".

During the recording of data on the B-surface of the erasable-type optical disc 10, the accessed point on the B surface moves from the outermost part of the zone "1" to the innermost part thereof, and then jumps to the outermost part of the zone "2" and moves from the outermost part of the zone "2" to the innermost part thereof. The subsequent zones "3", "4", . . . are similarly scanned. For example, the sector "20" in the circle-corresponding track portion with a track order number of 2999 in the B-surface zone "1" stores a first data segment related to a frame "0".

Conditions of data recorded on the zone "z" in the B surface of the erasable-type optical disc 10 are such as shown in FIG. 9. The zone order number "z" corresponding to the B-surface position of the head of the recorded data segment related to the frame order number "f" is similar to the zone order number "z" corresponding to the A-surface position of the head of the recorded data segment related to the frame order number "f". Accordingly, the zone order number "z" corresponding to the B-surface position of the head of the recorded data segment related to the frame order number "f" is given by the previously-indicated equations (2) and (3).

The sum s4 of the sectors In the zone "1" to the zone "z" is given as follows.

$$s4 = \sum_{k=1}^{z} 3000(2k+19) \qquad (8)$$

The number s5 of the sectors in the zone "z" which store data segments starting from the start data segment related to the frame order number "f" is given as follows.

$$s5 = (2z+19)\{u-3000(z-1)\}+v+1 \qquad (9)$$

The number s6 of the sectors storing the data segments related to the frame order number "0" to the frame order number "f−1" is equal to the number s4 minus the number s5. Therefore, in the case where the recorded data conforms to the NTSC system, the number s6 is given as follows.

$$s6 = s4 - s5 \qquad (10)$$

$$s5 - s6 = 32f$$

Using these equations provides the following relation.

$$9000z^2 + 111000z - 57001 - 32f = (2z+19)u+v \qquad (11)$$

According to the equation (11), in the case where the recorded data conforms to the NTSC system, the sector order number "v" corresponding to the B-surface position of the head of the recorded data segment related to the frame order number "f" is given as follows.

$$v = (9000z^2 + 111000z - 57001 - 32f) \% (2z+19) \qquad (12)$$

where "... % ..." denotes the remainder in the division of the term preceding "%" by the term following "%". According to the equation (11), the track order number "u" corresponding to the B-surface position of the head of the recorded data segment related to the frame order number "f" is given as follows.

$$u = (9000z^2 + 111000z - 57001 - 32f - v)/(2z+19) \qquad (13)$$

The equations (12) and (13) are good in the case where the recorded data conforms to the NTSC system.

Generally, compressed PAL digital data is recorded on the erasable-type optical disc 10 at a rate of about 76 kB per frame in connection with each of the A surface and the B surface of the optical disc 10. When the recording capacity per sector is set to 2 kB, the total number of sectors per frame is equal to 38. In this case, the sector order number "s" corresponding to the A-surface position of the head of the recorded data segment related to the frame order number "f" is given as follows.

$$s = \{38f + 3000z(z-1)\} \% (2z+19) \qquad (14)$$

where "... % ..." denotes the remainder in the division of the term preceding "%" by the term following "%". In addition, the track order number "t" corresponding to the A-surface position of the head of the recorded data segment related to the frame order number "f" is given as follows.

$$t = \{38f + 3000z(z-1) - s\}/(2z+19) \qquad (15)$$

Further, the sector order number "v" corresponding to the B-surface position of the head of the recorded data segment related to the frame order number "f" is given as follows.

$$v = (9000z^2 + 111000z - 57001 - 38f) \% (2z+19) \qquad (16)$$

where "... % ..." denotes the remainder in the division of the term preceding "%" by the term following "%". In addition, the track order number "u" corresponding to the B-surface position of the head of the recorded data segment related to the frame order number "f" is given as follows.

$$u = (9000z^2 + 111000z - 57001 - 38f - v)/(2z+19) \qquad (17)$$

The equations (14), (15), (16), and (17) are good in the case where the recorded data conforms to the PAL system.

The sector order number "v" and the track order number "u" corresponding to the B-surface position of the head of the recorded data segment related to the frame order number "f" can be calculated from the sector order number "s" and the track order number "t" corresponding to the A-surface position of the head of the recorded data segment related to the frame order number "f". In this case, the sector order number "v" and the track order number "u" are given as follows.

$$v = (2z+19) - 1 - s \qquad (18)$$

$$u = 3000(2z-1) - 1 - t \qquad (19)$$

The equations (18) and (19) are good in the case where the recorded data conforms to the NTSC system or the PAL system.

In the case where the recorded data conforms to the NTSC system, since one frame corresponds to an interval of 1/30 second, the order number "f" of a given frame is expressed by absolute time (a-minute, b-second, c-th frame) thereof as follows.

$$f = 60 \cdot 30a + 30b + c \qquad (20)$$

In the case where the recorded data conforms to the PAL system, since one frame corresponds to an interval of 1/25 second, the order number "f" of a given frame is expressed by absolute time (a-minute, b-second, c-th frame) thereof as follows.

$$f = 60 \cdot 25a + 25b + c \qquad (21)$$

When the equation (20) is used in the equation (6), the sector order number "s" corresponding to the A-surface position of the head of the recorded data segment related to the frame order number "f" is given as follows.

$$s = \{32(1800a + 30b + c) + 3000z(z-1)\} \% (2z+19) \qquad (22)$$

where "... % ..." denotes the remainder in the division of the term preceding "%" by the term following "%". When the equation (20) is used in the equation (7), the track order number "t" corresponding to the A-surface position of the head of the recorded data segment related to the frame order number "f" is given as follows.

$$t = \{32(1800a + 30b + c) + 3000z(z-1) - s\}/(2z+19) \qquad (23)$$

The equations (22) and (23) are good in the case where the recorded data conforms to the NTSC system.

When the equation (20) is used in the equation (12), the sector order number "v" corresponding to the B-surface position of the head of the recorded data segment related to the frame order number "f" is given as follows.

$$v=\{9000z^2+11100z-57001-32(1800a+30b+c)\}\% \ (2z+19) \quad (24)$$

where "... % ..." denotes the remainder in the division of the term preceding "%" by the term following "%". When the equation (20) is used in the equation (13), the track order number "u" corresponding to the B-surface position of the head of the recorded data segment related to the frame order number "f" is given as follows.

$$u=\{9000z^2+11100z-57001-32(1800a+30b+c)-v\}/(2z+19) \quad (25)$$

The equations (24) and (25) are good in the case where the recorded data conforms to the NTSC system.

When the equation (21) is used in the equation (14), the sector order number "s" corresponding to the A-surface position of the head of the recorded data segment related to the frame order number "f" is given as follows.

$$s\{38(1500a+25b+c)+3000z(z-1)\}\% \ (2z+19) \quad (26)$$

where "... % ..." denotes the remainder in the division of the term preceding "%" by the term following "%". When the equation (21) is used in the equation (15), the track order number "t" corresponding to the A-surface position of the head of the recorded data segment related to the frame order number "f" is given as follows.

$$t=\{38(1500a+25b+c)+3000z(z-1)-s\}/(2z+19) \quad (27)$$

The equations (26) and (27) are good in the case where the recorded data conforms to the PAL system.

When the equation (21) is used in the equation (16), the sector order number "v" corresponding to the B-surface position of the head of the recorded data segment related to the frame order number "f" is given as follows.

$$v=\{9000z^2+11100z-57001-38(1500a+25b+c)\}\% \ (2z+19) \quad (28)$$

where "... % ..." denotes the remainder in the division of the term preceding "%" by the term following "%". When the equation (21) is used in the equation (17), the track order number "u" corresponding to the B-surface position of the head of the recorded data segment related to the frame order number "f" is given as follows.

$$u=\{9000z^2+11100z-57001-38(1500a+25b+c)-v\}/(2z+19) \quad (29)$$

The equations (28) and (29) are good in the case where the recorded data conforms to the PAL system.

Figure 11:
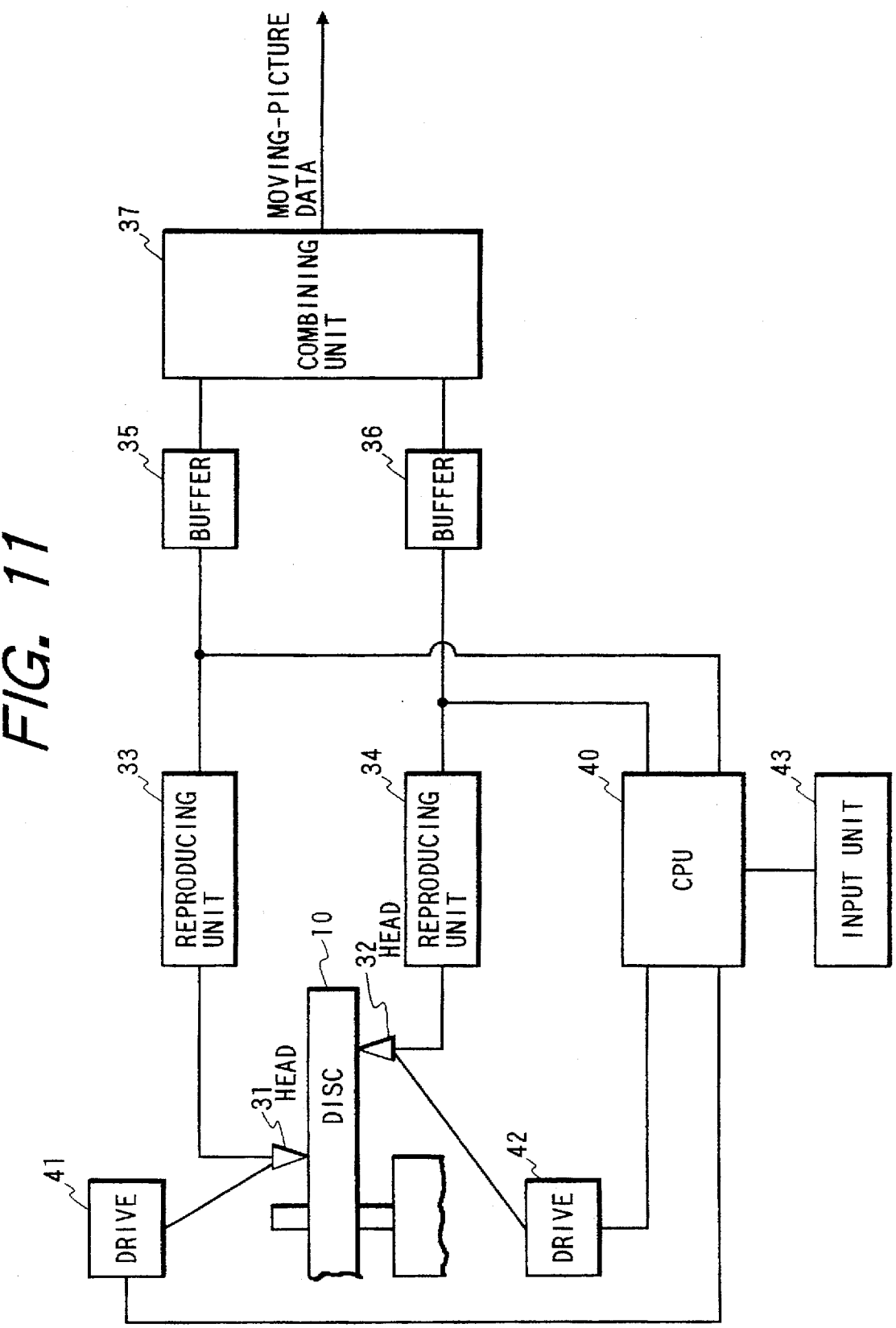
FIG. 11 is a block diagram of a reproducing apparatus according to the embodiment of this invention.

With reference to FIG. 11, a reproducing apparatus includes optical heads 31 and 32, reproducing units 33 and 34, buffer memories 35 and 36, a combining unit 37, a CPU 40, head drive units 41 and 42, and an input unit 43. The optical heads 31 and 32 are electrically followed by the reproducing units 33 and 34 respectively. The reproducing units 33 and 34 are followed by the buffer memories 35 and 36 respectively. The buffer memories 35 and 36 are followed by two input sides of the combining unit 37 respectively.

The head drive units 41 and 42 are connected to the optical heads 31 and 32 respectively. The CPU 40 is connected to the head drive units 41 and 42. The CPU 40 is connected to output sides of the reproducing units 33 and 34. In addition, the CPU 40 is connected to the input unit 43.

The radial position of the optical head 31 relative to an erasable-type optical disc 10 is controlled by the head drive unit 41. The radial position of the optical head 32 relative to the optical disc 10 is controlled by the head drive unit 42.

The optical head 31 reads out odd-field data from the A surface of the optical disc 10. The readout odd-field data is fed from the optical head 31 to the reproducing unit 33. The reproducing unit 33 converts the odd-field data into another form. The data conversion implemented by the reproducing unit 33 is inverse with respect to the data conversion by the recording unit 16 in FIG. 3. The reproducing unit 33 stores the resultant odd-field data into the buffer memory 35. In addition, the reproducing unit 33 informs the CPU 40 of the resultant odd-field data.

The optical head 32 reads out even-field data from the B surface of the optical disc 10. The readout even-field data is fed from the optical head 32 to the reproducing unit 34. The reproducing unit 34 converts the even-field data into another form. The data conversion implemented by the reproducing unit 34 is inverse with respect to the data conversion by the recording unit 17 in FIG. 3. The reproducing unit 34 stores the resultant even-field data into the buffer memory 36. In addition, the reproducing unit 34 informs the CPU 40 of the resultant even-field data.

The combining unit 37 reads out the odd-field data from the buffer memory 35. Simultaneously, the combining unit 37 reads out the even-field data from the buffer memory 36. The combining unit 37 combines the odd-field data and the even-field data to recover the original moving-picture data. The combining unit 37 outputs the recovered moving-picture data.

As previously described, the zones on the A surface and the zones on the B surface of the optical disc 10 are grouped into pairs each having an A-surface zone and a B-surface zone opposite to each other. An A-surface zone and a B-surface zone in each pair are simultaneously subjected to data reading processes by the optical heads 31 and 32 respectively. The A-surface zone is scanned from an inner edge toward an outer edge thereof while the B-surface zone is scanned from an outer edge toward an inner edge thereof. Accordingly, the direction of radial movement of the optical head 31 is opposite to the direction of radial movement of the optical head 32.

After the scanning of a B-surface zone is completed, the optical head 32 is required to jump to a position corresponding to the outer edge of a next B-surface zone. Such a jump causes a difference in timing between the odd-field data stored into the buffer memory 35 and the even-field data stored into the buffer memory 36. The reading of the odd-field data and the even-field data from the buffer memories 35 and 36 by the combining unit 37 is designed to compensate for the timing difference between the odd-field data stored into the buffer memory 35 and the even-field data stored into the buffer memory 36.

A search for a head of a recorded program is implemented by the reproducing apparatus as follows. When a user designates a recorded program by operating the input unit 43, the CPU 40 decides a frame order number or absolute time which corresponds to the head of the designated program. For example, the reproducing apparatus includes a memory storing information of the relation between a frame order number (or absolute time) and a head of each recorded program. The CPU 40 accesses this memory and refers to the information of the relation in deciding the frame order number or the absolute time corresponding to the head of the designated program. Then, the CPU 40 calculates a zone order number (a zone identification number), a track order number (a track identification number), and a sector order number (a sector identification number), which correspond to the head of the designated program, from the decided frame order number or the decided absolute time. Subsequently, the CPU 40 controls the head drive units 41 and 42, thereby moving the optical heads 31 and 32 to positions corresponding to the calculated zone order number, the calculated track order number, and the calculated sector order number. In this way, the optical heads 31 and 32 are moved to positions corresponding to the head of the designated program.

Figure 12:
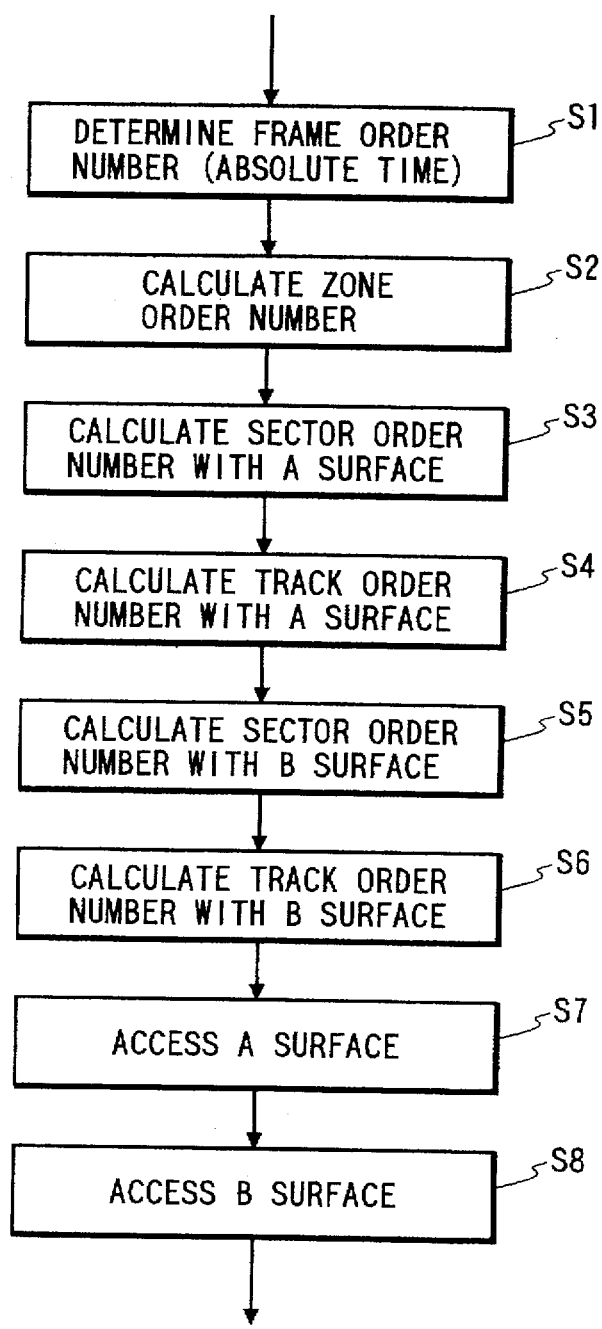
FIG. 12 is a flowchart of a segment of a control program for a CPU in FIG. 1.

The CPU 40 includes a combination of an input/output port, a processing section, a RAM, and a ROM. The CPU 40 operates in accordance with a control program stored in the ROM. FIG. 12 is a flowchart of a segment of the control program for the CPU 40 which relates to a search for a head of a designated recorded program. The control-program segment in FIG. 12 is started when the input unit 43 is operated to designate a recorded program.

As shown in FIG. 12, a step S1 in the control-program segment calculates or decides a frame order number (or absolute time) which corresponds to the head of the designated program. A step S2 following the step S1 calculates the zone order number, corresponds to the head of the designated program on each of the A surface and the B surface of an erasable-type optical disc 10, from the frame order number (or the absolute time) given by the step S1. The step S2 executes the calculation of the zone order number by referring to the equations (2) and (3).

A step S3 subsequent to the step S2 calculates the sector order number, which corresponds to the head of the designated program on the A surface of the optical disc 10, from the frame order number (or the absolute time) given by the step S1 and the zone order number given by the step S2. The step S3 executes the calculation of the sector order number by referring to the equation (6), (14), (22), or (26). A step S4 following the step S3 calculates the track order number, which corresponds to the head of the designated program on the A surface of the optical disc 10, from the frame order number (or the absolute time) given by the step S1, the zone order number given by the step S2, and the sector order number given by the step S3. The step S4 executes the calculation of the track order number by referring to the equation (7), (15), (23), or (27).

A step S5 subsequent to the step S4 calculates the sector order number, which corresponds to the head of the designated program on the B surface of the optical disc 10, from the frame order number (or the absolute time) given by the step S1 and the zone order number given by the step S2. The step S5 executes the calculation of the sector order number by referring to the equation (12), (16), (24), or (28). A step S6 following the step S5 calculates the track order number, which corresponds to the head of the designated program on the B surface of the optical disc 10, from the frame order number (or the absolute time) given by the step S1, the zone order number given by the step S2, and the sector order number given by the step S5. The step S6 executes the calculation of the track order number by referring to the equation (13), (17), (25), or (29).

A step S7 subsequent to the step S6 controls the head drive unit 41 in response to the zone order number given by the step S2, the sector order number given by the step S3, and the track order number given by the step S4 so that the optical head 31 will move to a position corresponding to the head of the designated program on the A surface of the optical disc 10. The step S7 may use an output signal of the reproducing unit 33 in the control of the head drive unit 41. In this case, the step S7 controls the position of the optical head 31 via the head drive unit 41 so that a currently-accessed point on the A surface of the optical disc 10 which is represented by the output signal of the reproducing unit 33 will agree with the designated-program head position corresponding to the zone order number given by the step S2, the sector order number given by the step S3, and the track order number given by the step S4.

A step S8 subsequent to the step S7 controls the head drive unit 42 in response to the zone order number given by the step S2, the sector order number given by the step S5, and the track order number given by the step S6 so that the optical head 32 will move to a position corresponding to the head of the designated program on the B surface of the optical disc 10. The step S8 may use an output signal of the reproducing unit 34 in the control of the head drive unit 42. In this case, the step S8 controls the position of the optical head 32 via the head drive unit 42 so that a currently-accessed point on the B surface of the optical disc 10 which is represented by the output signal of the reproducing unit 34 will agree with the designated-program head position corresponding to the zone order number given by the step S2, the sector order number given by the step S5, and the track order number given by the step S6. After the step S8, the program advances to a next step (not shown).

Figure 13:
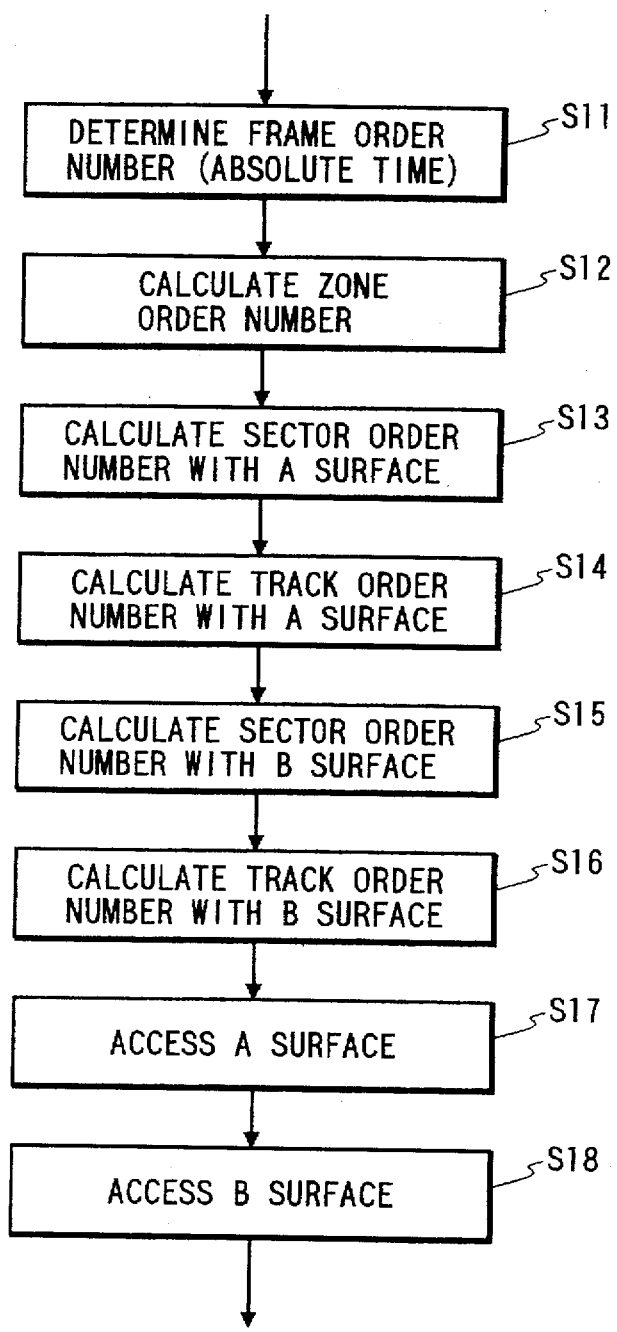
FIG. 13 is a flowchart of a segment of a control program for the CPU in FIG. 11 which can replace the control-program segment in FIG. 12.

The control-program segment in FIG. 12 may be replaced by a control-program segment in FIG. 13. The control-program segment in FIG. 13 will now be described.

As shown in FIG. 13, a step S11 in the control-program segment calculates or decides a frame order number (or absolute time) which corresponds to the head of the designated program. A step S12 following the step S11 calculates the zone order number, which corresponds to the head of the designated program on each of the A surface and the B surface of an erasable-type optical disc 10, from the frame order number (or the absolute time) given by the step S11. The step S12 executes the calculation of the zone order number by referring to the equations (2) and (3).

A step S13 subsequent to the step S12 calculates the sector order number, which corresponds to the head of the designated program on the A surface of the optical disc 10, from the frame order number (or the absolute time) given by the step S11 and the zone order number given by the step S12. The step S13 executes the calculation of the sector order number by referring to the equation (6), (14), (22), or (26). A step S14 following the step S13 calculates the track order number, which corresponds to the head of the designated program on the A surface of the optical disc 10, from the frame order number (or the absolute time) given by the step S11, the zone order number given by the step S12, and the sector order number given by the step S13. The step S14 executes the calculation of the track order number by referring to the equation (7), (15), (23), or (27).

A step S15 subsequent to the step S14 calculates the sector order number, which corresponds to the head of the designated program on the B surface of the optical disc 10, from the zone order number given by the step S12 and the sector order number given by the step S13. The step S15 executes the calculation of the sector order number by referring to the equation (18). A step S16 following the step S15 calculates the track order number, which corresponds to the head of the designated program on the B surface of the optical disc 10, from the zone order number given by the step S12 and the track order number given by the step S14. The step S16 executes the calculation of the track order number by referring to the equation (19).

A step S17 subsequent to the step S16 controls the head drive unit 41 in response to the zone order number given by the step S12, the sector order number given by the step S13, and the track order number given by the step S14 so that the optical head 31 will move to a position corresponding to the head of the designated program on the A surface of the optical disc 10. The step S17 may use an output signal of the reproducing unit 33 in the control of the head drive unit 41. In this case, the step S17 controls the position of the optical head 31 via the head drive unit 41 so that a currently-accessed point on the A surface of the optical disc 10 which is represented by the output signal of the reproducing unit 33 will agree with the designated-program head position corresponding to the zone order number given by the step S12, the sector order number given by the step S13, and the track order number given by the step S14.

A step S18 subsequent to the step S17 controls the head drive unit 42 in response to the zone order number given by the step S12, the sector order number given by the step S15, and the track order number given by the step S16 so that the optical head 32 will move to a position corresponding to the head of the designated program on the B surface of the optical disc 10. The step S18 may use an output signal of the reproducing unit 34 in the control of the head drive unit 42. In this case, the step S18 controls the position of the optical head 32 via the head drive unit 42 so that a currently-accessed point on the B surface of the optical disc 10 which is represented by the output signal of the reproducing unit 34 will agree with the designated-program head position corresponding to the zone order number given by the step S12, the sector order number given by the step S15, and the track order number given by the step S16. After the step S18, the program advances to a next step (not shown).

What is claimed is:

1. A method of recording information on an erasable optical disc having first and second recording surfaces, the method comprising the steps of:

dividing first data into second data and third data which remain equal to each other in data rate;

feeding the second data and the third data to first and second recording heads respectively; and simultaneously recording the second data and the third data on the first and second recording surfaces of the optical disc by the first and second recording heads respectively in a zoned constant linear velocity technique in which each of the first and second recording surfaces of the optical disc is divided into zones, and the zones of the first recording surface and the zones of the second recording surface are grouped into pairs each having a zone of the first recording surface and a zone of the second recording surface which are opposite to each other, in which the second data and the third data are simultaneously recorded on zones in a pair respectively while the first and second recording heads are moved in opposite radial directions of the optical disc respectively, and in which the first recording head successively scans the zones of the first recording surface while the second recording head successively scans the zones of the second recording surface.

2. A method as recited in claim 1, wherein the second data corresponds to odd fields, and the third data corresponds to even fields.

3. A method as recited in claim 1, further comprising the step of adding one out of information of absolute time and information of a frame order number to the second data and the third data before the second data and the third data are recorded on the optical disc.

4. An apparatus for recording information on an erasable optical disc having first and second recording surfaces, the apparatus comprising:

first means for dividing first data into second data and third data which remain equal to each other in data rate;

first and second recording heads;

second means for feeding the second data and the third data to the first and second recording heads respectively; and third means for simultaneously recording the second data and the third data on the first and second recording surfaces of the optical disc by the first and second recording heads respectively in a zoned constant linear velocity technique in which each of the first and second recording surfaces of the optical disc is divided into zones, and the zones of the first recording surfaces and the zones of the second recording surface are grouped into pairs each having a zone of the first recording surface and a zone of the second recording surface which are opposite to each other, in which the second data and the third data are simultaneously recorded on zones in a pair respectively while the first and second recording heads are moved in opposite radial directions of the optical disc respectively, and in which the first recording head successively scans the zones of the first recording surface while the second recording head successively scans the zones of the second recording surface.

5. An apparatus as recited in claim 4, wherein the second data corresponds to odd fields, and the third data corresponds to even fields.

6. An apparatus as recited in claim 4, further comprising fourth means for adding one out of information of absolute time and information of a frame order number to the second data and the third data before the second data and the third data are recorded on the optical disc.

7. A method of recording information on an optical disc having a first and second recording surfaces, the method comprising the steps of:

dividing first data into second data and third data which are equal to each other in data rate;

feeding the second data and the third data to first and second recording heads respectively; and simultaneously recording the second data and the third data on the first and second recording surfaces of the optical disc by the first and second recording heads respectively, wherein each of the first and second recording surfaces of the optical disc is divided into zones, and the zones of the first recording surface and the zones of the second recording surface are grouped into pairs each having a zone of the first recording surface and a zone of the second recording surface which are opposite to each other, wherein the second data and the third data are simultaneously recorded on zones in a pair respectively while the first and second recording heads are moved in an outward radial direction and an inward radial direction of the optical disc respectively, and wherein recording of the second data and the third data on zones is followed by recording of the second data and the third data on outwardly neighboring zones, and wherein during a transition from recording of the second data and the third data on zones to recording of the second data and the third data on outwardly neighboring zones, the first recording head moves from an outer edge of a zone to an inner edge of an outwardly neighboring zone while the second recording head jumps from an inner edge of a zone to an outer edge of an outwardly neighboring zone.

8. A method as recited in claim 7, wherein the second data corresponds to odd fields, and the third data corresponds to even fields.

9. A method as recited in claim as recited in claim 7, further comprising the step of adding one of information of absolute time and information of a frame order to the second data and the third data before the second data and the third data are recorded on the optical disc.

10. An apparatus for recording information on an optical disc having first and second recording surfaces, the apparatus comprising:

first means for dividing first data into second data and third data which are equal to each other in data rate;

first and second recording heads;

second means for feeding the second data and the third data to the first and second recording heads respectively; and third means for simultaneously recording the second data and the third data on the first and second recording surfaces of the optical disc by the first and second recording heads respectively, wherein each of the first and second recording surfaces of the optical disc is divided into zones, and the zones of the first recording surface and the zones of the second recording surface are grouped into pairs each having a zone of the first recording surface and a zone of the second recording surface which are opposite to each other, wherein the second data and the third data are simultaneously recorded on zones in a pair respectively while the first and second recording heads are moved in an outward radial direction and an inward radial direction of the optical disc respectively, and wherein recording of the second data and the third data on zones is followed by recording of the second data and the third data on outwardly neighboring zones, and wherein during a transition from recording of the second data and the third data on zones to recording of the second data and the third data on outwardly neighboring zones, the first recording head moves from an outer edge of a zone to an inner edge of an outwardly neighboring zone while the second recording head jumps from an inner edge of a zone to an outer edge of an outwardly neighboring zone.

11. An apparatus as recited in claim 10, wherein the second data corresponds to odd fields, and the third data corresponds to even fields.

12. An apparatus as recited in claim 10, further comprising fourth means for adding information of absolute time to the second data and the third data before the second data and the third data are recorded on the optical disc.

13. An apparatus as recited in claim 10, further comprising fourth means for adding information of a frame order number to the second data and the third data before the second data and the third data are recorded on the optical disc.

* * * * *